United States Patent
Venzal (10) Patent No.: US 11,248,972 B2
(45) Date of Patent: Feb. 15, 2022

(54) TORQUE SENSOR FOR A ROTATING ELEMENT USING A MECHANICAL FRICTION COUPLING

(71) Applicants: Continental Automotive France, Toulouse (FR); Continental Automotive GmbH, Hannover (DE)

(72) Inventor: Simon-Didier Venzal, Toulouse (FR)

(73) Assignees: Continental Automotive France; Continental Automotive GmbH

(*) Notice: Subject to any disclaimer, the term of this patent is extended or adjusted under 35 U.S.C. 154(b) by 65 days.

(21) Appl. No.: 16/757,947

(22) PCT Filed: Oct. 16, 2018

(86) PCT No.: PCT/FR2018/052566
§ 371 (c)(1),
(2) Date: Apr. 21, 2020

(87) PCT Pub. No.: WO2019/081834
PCT Pub. Date: May 2, 2019

(65) Prior Publication Data
US 2020/0264060 A1 Aug. 20, 2020

(30) Foreign Application Priority Data

Oct. 24, 2017 (FR) .................................. 1760025

(51) Int. Cl.
*G01L 3/10* (2006.01)
(52) U.S. Cl.
CPC .................................. *G01L 3/108* (2013.01)
(58) Field of Classification Search
CPC . G01L 1/18; G01L 1/26; G01L 1/2231; G01L 3/108
See application file for complete search history.

(56) References Cited

U.S. PATENT DOCUMENTS 2,900,613 A     8/1959   Dahl
3,710,618 A *   1/1973   Pagel ........................ G01L 3/02
                                                                                  73/862.323
(Continued)

FOREIGN PATENT DOCUMENTS

CN          1752725 A      3/2006
CN          2800251 Y      7/2006
(Continued)

OTHER PUBLICATIONS

Xu, J. et al., "A Wireless Fixture Torque Sensor based on SAW Resonator," Aug. 31, 2012, vol. 31(4), Pt. 2, pp. 79-82, Technical Acoustics, Proceedings of 2012 Western China Acoustics Academic Exchange Conference (1), abstract only.
(Continued)

*Primary Examiner* — Max H Noori
(74) *Attorney, Agent, or Firm* — RatnerPrestia (57) ABSTRACT

A torque sensor intended to be mounted on a rotating element in a motor vehicle, the torque sensor including at least one strain gauge disposed on an adhesive material layer. The glass layer rests on a face of a substrate made of a rigid material capable of ensuring frictional retention against the rotating element by its face that is opposite that supporting the glass layer, the torque sensor including detachable and adjustable pressure device surrounding the glass layer and the substrate, the detachable and adjustable pressure device being intended to surround the rotating element and to press the face opposite the substrate against the rotating element.

14 Claims, 5 Drawing Sheets

(56) References Cited

U.S. PATENT DOCUMENTS

| | | | |
|---|---|---|---|
| 3,889,490 A * | 6/1975 | Nadolny | B25B 23/1427 464/23 |
| 4,414,854 A * | 11/1983 | Haeg | G01M 13/025 73/847 |
| 5,535,631 A | 7/1996 | Paine | |
| 7,401,531 B2 | 7/2008 | Cripe | |
| 7,669,941 B2 | 3/2010 | Ai et al. | |
| 8,316,725 B2 * | 11/2012 | Wade | G01L 1/26 73/862.627 |
| 8,393,230 B2 | 3/2013 | Jeon et al. | |
| 9,003,891 B2 | 4/2015 | Frank | |
| 9,225,227 B2 * | 12/2015 | Schroeder | H02K 11/215 |
| 10,184,848 B2 | 1/2019 | Klopf et al. | |
| 10,436,663 B2 | 10/2019 | Liu et al. | |
| 11,067,460 B2 * | 7/2021 | Venzal | G01D 5/2053 |
| 2007/0186690 A1 | 8/2007 | Gassmann et al. | |
| 2011/0197715 A1 | 8/2011 | Leicht | |

FOREIGN PATENT DOCUMENTS

| | | |
|---|---|---|
| CN | 101198480 A | 6/2008 |
| CN | 201096582 Y | 8/2008 |
| CN | 101395055 A | 3/2009 |
| CN | 101666696 A | 3/2010 |
| CN | 101858802 A | 10/2010 |
| CN | 101980915 A | 2/2011 |
| CN | 102589761 A | 7/2012 |
| CN | 102869547 A | 1/2013 |
| CN | 103487183 A | 1/2014 |
| CN | 203837849 U | 9/2014 |
| CN | 104198107 A | 12/2014 |
| CN | 104316241 A | 1/2015 |
| CN | 104677536 A | 6/2015 |
| CN | 105277302 A | 1/2016 |
| CN | 107209072 A | 9/2017 |
| DE | 19954300 A1 | 5/2001 |
| EP | 2466284 A1 | 6/2012 |
| JP | 08193894 A | 7/1996 |
| KR | 20090002876 U | 3/2009 |
| WO | 2007033900 A1 | 3/2007 |

OTHER PUBLICATIONS

Brookhuis, R.A., et al., "Scalable Six-Axis Force-Torque Sensor with a Large Range for Biomechanical Applications," Dec. 31, 2014, MEMS 2012, Paris, France, Jan. 29-Feb. 2, 2012, pp. 595-598, Journal of Micromechanics & Microengineering.

Chinese Office Action for Chinese Application No. 201880069101.0, dated Mar. 1, 2021, with translation, 17 pages.

Chinese Notice of Allowance for Chinese Application No. 201880069101.0, dated Jul. 23, 2021, with translation, 7 pages.

International Search Report and Written Opinion for International Application No. PCT/FR2018/052566, dated Mar. 20, 2019, 20 pages (French).

* cited by examiner

TORQUE SENSOR FOR A ROTATING ELEMENT USING A MECHANICAL FRICTION COUPLING

CROSS REFERENCE TO RELATED APPLICATIONS

This application is the U.S. National Phase Application of PCT International Application No. PCT/FR2018/052566, filed Oct. 16, 2018, which claims priority to French Patent Application No. 1760025, filed Oct. 24, 2017, the contents of such applications being incorporated by reference herein.

FIELD OF THE INVENTION

The present invention relates to a torque sensor for measuring the torque of a rotating element using a mechanical friction coupling. The invention also relates to an assembly of a rotating element with such a torque sensor and to a method for mounting a torque sensor on a rotating element.

BACKGROUND OF THE INVENTION

In general, a torque sensor comprises at least one strain gauge disposed on an adhesive material layer. Said at least one strain gauge transmits an electric signal as a function of the torsion experienced by the rotating element under the effect of a force torque. The reception and transmission of the electric signal by electronic means allows the torque of the rotating element to be measured.

Measuring the torsion torque of a drive shaft that is considered to be an example of a rotating element, which is by no means limiting, can be performed in various manners.

One of the most common methods involves attaching and/or adhering deformation gauges, which most often are of the metal linear type, directly onto the relevant shaft. These are then placed at an angle of +/−45° in relation to the axis of the shaft in order to be sensitive to the deformations originating from torsion. These gauges then simply need to be connected to a suitable electronic processing unit for recovering a signal representing the torque imposed on the rotating element, which is the drive shaft.

A derived method involves not adhering these gauges onto the shaft but forcibly pressing them onto the shaft so that they can measure the deformations originating from the torque. These deformations are then transferred to the gauges through the effect of friction.

For adhered gauges, this type of assembly is generally accompanied by a loss of precision due to the presence of the glue. In the vast majority of cases this glue is a fairly flexible material and deforms in a non-linear manner, with the elastic limit being rapidly exceeded, resulting in the appearance of significant hysteresis errors.

The relevant glue is also, in general, a chemical compound that is fairly unstable over time and that will have a tendency to degrade, dry, lose elasticity, so as to often and progressively weaken and break.

Finally, the presence and the contact with other chemical elements, such as transmission oils, can damage this glue or the gauges themselves, or at least accelerate the aging thereof.

With respect to pressed gauges, while this principle resolves the concerns resulting from the use of a glue, since it is not necessary in this case, these gauges can still be damaged by the aggressive oils and liquids of a transmission. However, the strain gauges are elements that can be easily damaged and subjecting them to friction is not recommended.

The friction implemented with this principle generally leads to progressive degradation, in this case mechanical, of the strain gauges.

The problems encountered by the methods of the prior art are mainly problems with respect to the degradation of the effectiveness of the measurement due to the glue, an insufficient lifetime for the measuring system, as well as low resistance to aggressive environments.

SUMMARY OF THE INVENTION

The problem underlying the present invention is that of designing a torque sensor integrating at least one strain gauge for measuring torque on a rotating element that can ensure optimal contact of the one or more strain gauges with the element, with this contact having to provide durable resistance and the one or more strain gauges having to be protected against external attacks.

To this end, an aspect of the present invention relates to a torque sensor intended to be mounted on a rotating element in a motor vehicle, the torque sensor comprising at least one strain gauge disposed on an adhesive material layer, said at least one strain gauge transmitting an electric signal as a function of the torsion experienced by the rotating element under the effect of a force torque, the reception and transmission of the electric signal allowing the torque of the rotating element to be measured after processing by transmission means, characterized in that the adhesive material layer rests on a face of a substrate made of a rigid material capable of ensuring frictional retention against the rotating element via its face that is opposite that supporting the adhesive material layer, the torque sensor comprising detachable and adjustable pressure means surrounding the adhesive material layer and the substrate, the detachable and adjustable pressure means being intended to surround the rotating element and to press the opposite face of the substrate against the rotating element.

Compared to the prior art of one or more adhered strain gauges, an aspect of the present invention avoids any problems due to such adhesion, i.e. the problem of disbonding of the one or more strain gauges, the problem of aging glue and the problem of each strain gauge being unable to receive the torsion exerted on the rotating element due to the insertion of the layer of glue.

According to an aspect of the invention, glue or any adhesive fixing element is not therefore used, providing the following benefits, namely a lack of hysteresis added to the signal, less aging or better controlled aging to maintain better performance over time. Furthermore, as a result of the detachable and adjustable pressure means, it is possible to easily remove the sensor so that it can be replaced in the event of a failure, for example.

Compared to the prior art of one or more strain gauges placed directly in contact with the rotating element, an aspect of the present invention avoids any wear that would involve damaging the strain gauges directly experiencing the torsion of the rotating element through direct contact with this element. The one or more strain gauges are not placed in direct contact with the rotating element so as to increase the lifetime of the one or more gauges, since they do not experience frictional abrasion.

The substrate fulfills an insertion function between, on the one hand, the one or more strain gauges and, on the other hand, the rotating element. The substrate is fairly rigid in order to withstand the friction with the rotating element and transfer the torsion to the strain gauges. Therefore, the substrate protects the strain gauges against any wear due to any friction on the rotating element. This constitutes a first effect that is obtained for a torque sensor according to an aspect of the present invention.

Furthermore, frictional contact between the substrate and the rotating element with a material of the selected substrate gives the substrate a role of a mini-surface amplifier and improves the detection of the torsion. The contact surface of the substrate with the rotating element is larger than the contact surface would be of the one or more strain gauges with the rotating element. However, having this smallest possible surface allows the pressure to be increased and thus allows the friction to be improved, resulting in better detection of the torsion of the rotating element.

It is possible to select a substrate with a specific material and surface treatment that provide better friction between the substrate and the rotating element, whereas such a possibility does not exist on the material of the one or more strain gauges that is predefined by the strain gauge manufacturer. This constitutes a second effect that is obtained for a torque sensor according to an aspect of the present invention.

Combining a substrate with an adhesive material layer, as well as with detachable and adjustable pressure means at least partially surrounding the detection part formed by the one or more strain gauges, allows the one or more strain gauges to be protected against external attacks such as oil spray. This constitutes a third effect that is obtained for a torque sensor according to an aspect of the present invention.

The friction between the substrate and the rotating element is advantageously adjustable by the detachable and adjustable pressure means, in particular by clamping the pressure means against each other in two parts. Therefore, there is significant freedom to adjust this friction. The detachable and adjustable pressure means can be removed, which facilitates the mounting and removal of the torque sensor, which cannot be obtained with adhered strain gauges. The pressure means at least partially surrounding the substrate and the adhesive material layer help to protect the one or more strain gauges disposed on the adhesive material layer.

It follows that, for an aspect of the present invention, there is strong synergy between the one or more strain gauges disposed on an adhesive material layer, a friction substrate with the rotating element and the pressure means that helps to achieve maximum protection of the inside of the torque sensor and in particular of the one or more strain gauges, whilst allowing optimal adjustment of the friction between the rotating element and the torque sensor.

The durability of the one or more strain gauges is increased, with better protection of the one or more strain gauges combined with better accessibility to the one or more strain gauges during manufacturing, which at first sight is incompatible, being obtained.

An environmental benefit is obtained due to the removal of the glue that could include components that are harmful to the environment.

By virtue of the adjustable pressure means for providing optimal friction between the substrate and the portion of the rotating element receiving the substrate and by virtue of the selection of a specific substrate, many possibilities exist for adapting the sensor to a wide range of torque values to be measured, due to the adjustment of the level of the strains observed by the one or more gauges, by modifying the configuration of the substrate and in particular its thickness, and the pressure exerted by the pressure means on the substrate.

Advantageously, the detachable and adjustable pressure means are formed by two shell portions extending each other in order to form a complete shell, with fixing means of the threaded rod type securing the two shell portions together, with the substrate and the adhesive material layer being housed in the interior of the two shell portions.

The designation "shell portions" does not necessarily mean that the two portions are equivalent, but that they are complementary so as to form a complete shell when they are placed end-to-end. The shell portions protect the substrate and the adhesive material layout by surrounding them. Their introduction around the rotating element and the rest of the torque sensor is facilitated due to the fact that the pressure means that they form are in the form of two shell portions, which are symmetrically disposed relative to the rotating element.

Advantageously, the two shell portions have different dimensions, with the substrate and the adhesive material layer being housed in the largest shell portion. It is also possible for the shell portions to have an angle of 180°, which allows the clamping screws to be placed in an effective axis.

This allows the substrate and the adhesive material layer supporting one or more strain gauges to be housed in a shell portion with the largest portion. In order to save material, the other one of the two shell portions does not have to be as big as the shell portion for housing the rest of the torque sensor.

Advantageously, the two shell portions secured together have a circular outer periphery, on which an incomplete or complete first ring is fixed, having an upper outer diameter which may or may not be greater than the outer periphery of the two shell portions, the shell portions and the first incomplete or complete ring being intended to be rotated with the element.

The first ring can be in the form of a ring portion, whilst being incomplete since it is not closed in order to, for example, only surround the circular outer periphery of one of the shell portions.

Advantageously, this first ring is not closed in order to allow the assembly to be mounted laterally relative to a rotation shaft, as opposed to mounting via one of the longitudinal ends of the shaft, which would then necessarily require connecting one of the transmission elements with the shaft.

The first ring also can be complete by completely surrounding the shell portions. This first ring is wired to the transmission means of the torque sensor in the vicinity of the one or more strain gauges and is advantageously used to electromagnetically communicate with the rest of the electronic means for processing the signal that are disposed at a distance from the torque sensor.

The first ring, the transmission means and the one or more strain gauges are rotationally secured, hence the possibility of a wired connection between them.

Advantageously, the first incomplete or complete ring comprises an outer rim connected to at least one of the shell portions by ribs, each of the ribs having a curved end facing said at least one shell portion in order to be at least partially applied against the outer periphery and to be fixed on the outer periphery by at least one connection element, the first ring having means for receiving the signal transmitted over wires by the transmission means and means for electromagnetically transmitting the signal.

The ribs, with their respective curved edge, allow the first incomplete or complete ring to be fixed at several points on at least one shell portion, with this shell portion being the largest of the two shell portions.

Given that this first ring, which is incomplete or complete, is intended to be rotated by the rotating element, securing it to at least one of the shell portions must be sufficient to overcome the centrifugal force that will be exerted on the first ring during rotation. Therefore, securing at several points is highly favorable for retaining the first incomplete or complete ring on at least one of the shell portions.

The communication between the transmission means and the first ring is wired, since the first ring is secured to the sensor and rotates with the sensor. However, a unit included in the first ring, comprising means for electromagnetically transmitting the signal, acts as an electromagnetic communication with an external signal processing unit, advantageously that of a second ring, which is fixed.

Advantageously, electronic means for receiving and processing the signal transmitted by the electromagnetic transmission means of the first ring are housed in a second ring facing the first incomplete or complete ring, the two rings having a diameter that may or may not be similar by being spaced apart from each other by a gap. The second ring can be fixed, whereas the first ring rotates, since the transmission between first and second rings is electromagnetic and not wired.

In another alternative embodiment, the two rings also can have a different diameter, with the second ring surrounding the first ring. The facing arrangement is then no longer axial but radial. In this case, the transmission or excitation coils are located not on the face of the rings, but on the periphery thereof. The part of the electronic means that is housed in the second ring can be in the form of a printed circuit board. A printed circuit board is more compact, which is conducive to its integration in the second ring.

Advantageously, the adhesive material layer is a sintered glass layer.

Advantageously, said at least one strain gauge is in the form of a micro-electromechanical system with piezoresistive cells.

Advantageously, the substrate is non-detachably secured to the pressure means while forming a single piece with these pressure means.

An aspect of the invention also relates to an assembly made up of a rotating element in a motor vehicle and of a torque sensor, characterized in that the detachable and adjustable pressure means surround a portion of the rotating element and have a face of the substrate that is opposite that supporting the adhesive material layer against the surrounded portion of the rotating element in order to establish frictional retention between the opposite face of the substrate and the surrounded portion.

According to the prior art, stipulations needed to be followed with respect to the rotating element, for example, its material, which had to be compatible for adhesion or friction, for example, a certain type of steel. Such provisions no longer exist within the scope of an aspect of the present invention, with a wider tolerance with respect to the rotating element, with the pressure means being able to be adjusted in order to obtain the desired friction.

Furthermore, requirements for locating and positioning the torque sensor on the rotating element are rendered unnecessary, since these locating requirements particularly required a central position with respect to the active magnetized zone on the element of the torque sensor within the context of torque detection using magnetostriction.

Advantageously, the surrounded portion comprises a flat surface receiving the opposite face of the substrate, said at least one strain gauge extending at 45° relative to a line parallel to a median axis of rotation of the rotating element in a plane of the strain gauge.

The flat surface is used to receive the substrate through application, on the rotating element, of the face that is opposite the face supporting the adhesive material layer, thus improving the frictional contact between the flat surface and the opposite face of the substrate.

Advantageously, the rotating element is a shaft or a flywheel.

Finally, an aspect of the invention relates to a method for mounting a torque sensor on a rotating element in a motor vehicle in order to form such an assembly, characterized in that it comprises the following steps:

positioning the supporting substrate on a face of the adhesive material layer on which said at least one strain gauge is disposed against a portion of the rotating element, the substrate being applied against the portion of the rotating element by its face that is opposite that supporting the adhesive material layer;

positioning pressure means around the substrate and the rotating element;

acting on the pressure means so that the opposite face of the substrate is frictionally retained against the portion.

As an alternative to positioning the substrate against a portion of the rotating element, positioning the substrate against the rotating element can be provided by housing it in the pressure means, advantageously in a shell portion forming part of the pressure means. This embodiment is preferred.

For positioning pressure means around the substrate and the rotating element, the rotating element can be introduced into the pressure means advantageously by separating the pressure means into two portions, for example, into two additional shell portions. In another alternative, the rotating element can be introduced by sliding through the pressure means.

Acting on the pressure means allows precise adjustment of the friction between the opposite face of the substrate and the portion facing the rotating element. A clamping action is preferred, since it is easy to measure. Since the clamping action depends on the friction to be obtained, applying a given measured clamping force, for example, using a torque wrench, will allow the desired friction to be obtained.

BRIEF DESCRIPTION OF THE DRAWINGS

Further features, aims and advantages of aspects of the present invention will become apparent upon reading the following detailed description and with reference to the accompanying drawings, which are provided by way of non-limiting examples and in which.

DETAILED DESCRIPTION OF THE PREFERRED EMBODIMENTS

In the remainder of the description, the term strain gauge or deformation gauge is understood to be any single element or any element comprising a plurality of components that converts a mechanical strain or a mechanical deformation into a variation of electric magnitude, with the magnitude more commonly being an electric resistance. A micro-electromechanical system "MEMS" with piezoresistive cells can be considered to be a strain gauge within the meaning of an aspect of the present invention.

With reference to all the figures, an aspect of the present invention relates to a torque sensor 1 intended to be mounted on a rotating element 2 in a motor vehicle in order to take measurements of torque exerted on the rotating element 2. The torque sensor 1, within the scope of an aspect of the present invention, also can act as a force or pressure sensor for the rotating element 2. An aspect of the invention involves measuring the torque or even the force experienced by the rotating element 2 by measuring the strains on the surface of this rotating element 2.

In the figures, the rotating element 2 is in the form of a shaft or of a transmission element, but this is by no means limiting, this rotating element 2 can assume another form such as, for example, that of a flywheel.

Figure 1A:
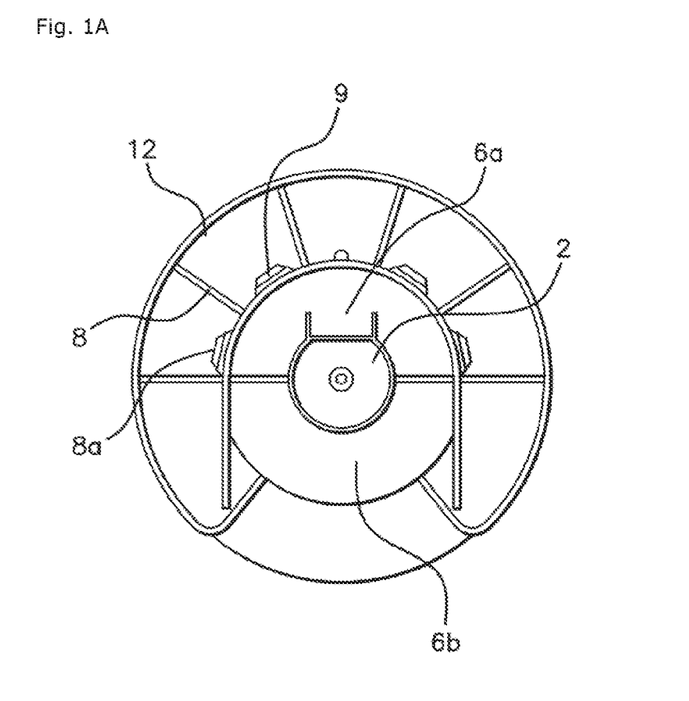
FIGS. 1A and 1B are respectively schematic representations of a front view of one embodiment of a torque sensor according to an aspect of the invention, the profile of which is formed by two shell portions at least partially surrounded by a first ring, and of a section view of one embodiment of a torque sensor according to an aspect of the invention showing the stacking, in particular of a substrate, of an adhesive material layer and of strain gauges.
Figure 1B:
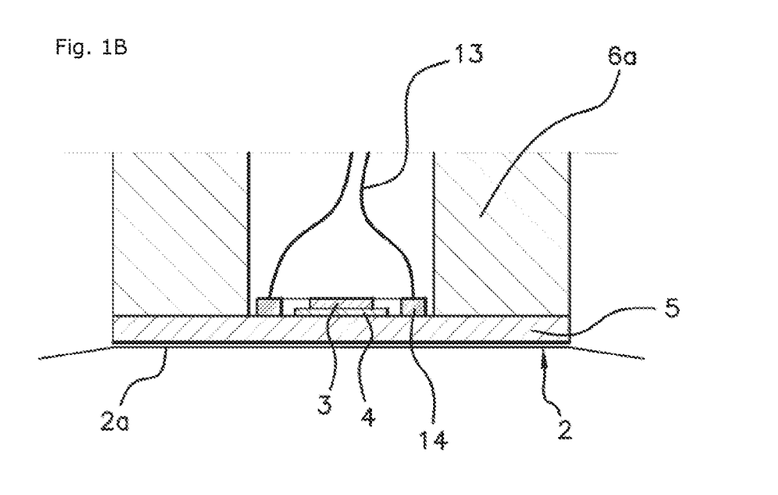

As is particularly clear in FIG. 1B, the torque sensor 1 comprises at least one strain gauge 3 disposed on an adhesive material layer 4. This adhesive material layer 4 advantageously, but in a non-limiting manner, can be a sintered glass layer. The sintering consolidates the glass particles together and allows them to be adhered on the one or more strain gauges. Epoxy or a cyano-acrylate glue can be cited as adhesive material in a non-limiting manner.

Figure 7:
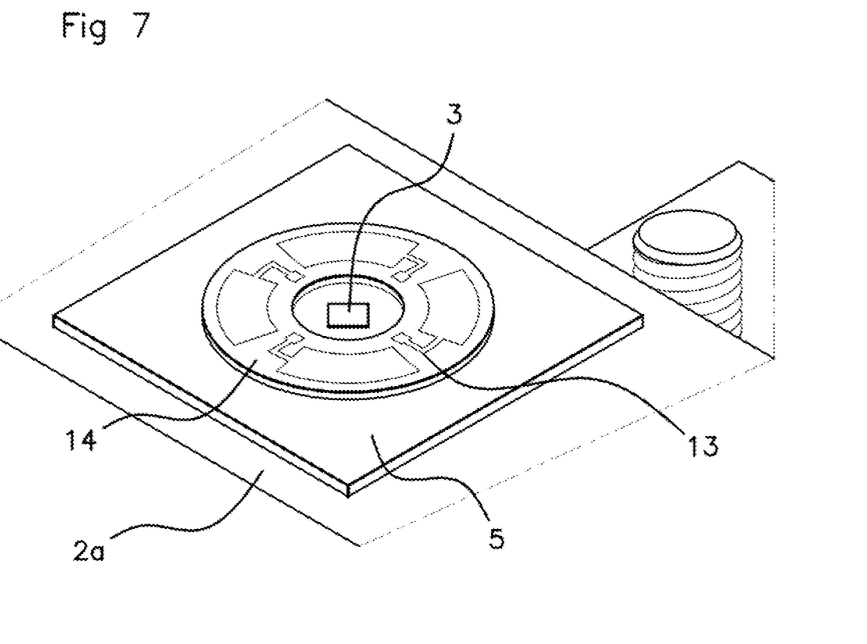
FIG. 7 is an exploded schematic representation compared to the other figures of a substrate supporting at least one strain gauge shown positioned on part of a rotating element for which the torque is to be measured, the substrate and the strain gauge forming part of a torque sensor according to one embodiment of the invention, the rest of the torque sensor not being shown in this figure.

FIG. 7 shows an exploded view, compared to the other figures, of a substrate 5, which will be more specifically described hereafter, and of a printed circuit board for interconnecting with its wire connection brazing blocks. In FIG. 7, the disk 14 with contacts represents means for transmitting the signal with lugs for brazing connection wires. The communication that is provided is therefore wired and is implemented with a first ring 12, as will be seen hereafter.

Conventionally, the one or more correctly biased strain gauges 3 transmit an electric signal as a function of the torsion experienced by the rotating element 2 under the effect of a torque force, with the reception and the transmission of the electric signal passing through an interconnection printed circuit board 14 acting as a means for transmitting the signal, having the sole purpose of accommodating the connections of a micro-electromechanical system 3 installed by ultrasonic welding and the connection wires 13 installed by brazing. The first additional wired reception means of the transmission means can be located on a printed circuit board inside the first ring 12.

With more particular reference to FIGS. 1A, 1B and 7 according to an aspect of the invention, the adhesive material layer 4 rests on a face of a substrate 5 made of a rigid material able to ensure frictional retention against the rotating element 2 via the face thereof that is opposite that supporting the adhesive material layer 4. In order to apply and adjust the friction, the torque sensor 1 comprises detachable and adjustable pressure means 6a, 6b surrounding the adhesive material layer 4 and the substrate 5. Detachable means that the pressure means 6a, 6b can be removed and adjustable means that the pressure exerted by these means 6a, 6b is adjustable.

These detachable and adjustable pressure means 6a, 6b are intended to surround the rotating element 2 and to press the opposite face of the substrate 5 against the rotating element 2 in order to obtain a desired friction. This can be achieved through an action of the pressure means 6a, 6b around the substrate 5 and the rotating element 2. The pressure means 6a, 6b are detachable and adjustable in order to ensure easy mounting and removal of the torque sensor 1 on/from the rotating element 2.

Therefore, an aspect of the present invention proposes disposing one or more of the strain gauges or deformation gauges, which are highly sensitive elements, on a flat surface of a substrate 5. The substrate 5 is a thin but rigid element formed by, for example, a metal material, such as stainless steel, advantageously, with high wear resistance.

The face of the substrate 5 that is opposite that supporting the adhesive material layer 4 and the one or more strain gauges 3 that are not necessarily flat will act as a detection interface with the rotating element 2. The opposite face advantageously conforms to the profiles of the rotating element 2, by being flat when the rotating element has a flat surface 2a, but they can assume another form suitable for the rotating element 2 for which the torque is to be measured.

The unused flat surface on the side where the one or more strain gauges 3 is disposed on the face of the substrate 5 supporting the adhesive material layer 4, therefore the flat surface that is left free, can be brought into contact with pressure means 6a, 6b so that the pressure means 6a, 6b exert a pressure on the substrate 5.

These pressure means can be in the form of a collar, advantageously made up of two upper and lower shell portions 6a, 6b provided with threaded rods 7. The purpose of the pressure means 6a, 6b is to both ensure that the assembly of the torque sensor 1 is mounted and clamped on the rotating element 2 on which the torque measurement must be taken, but especially to ensure that a pressure is applied on the substrate 5 against the rotating element 2 by bringing the face that is opposite the face supporting the adhesive material layer 4 into contact against the rotating element 2.

Therefore, the substrate 5 is located between the pressure means 6a, 6b and the rotating element 2. In order to ensure that the pressure means 6a, 6b are properly pressed on the substrate 5, then it is recommended that a distance is locally left between the pressure means 6a, 6b and the rotating element 2.

The pressure to be applied on the substrate 5 against the rotating element 2 is provided directly through an adjustment action performed on the pressure means 6a, 6b, in particular, but not only, by clamping. This action is to be controlled such as, for example, by controlling the clamping torque on a collar used as pressure means 6a, 6b by using threaded rods 7 in the form of screws or bolts.

The pressure value to be applied must be within two extremes. The maximum pressure to be applied will be connected to the mechanical resistance of the assembly, the minimum, for its part, will be defined in order to ensure minimum friction and therefore the transmission of the strains between the rotating element 2 and the substrate 5.

In this way, the substrate 5 receives the strains experienced by the rotating element 2, with the one or more deformation gauges mounted on the substrate 5 via the adhesive material layer 4 then being able to detect them. This minimum pressure to be applied therefore depends on the friction coefficient between the substrate 5 and the rotating element 2.

By way of an illustration, yet without being limiting, a typical pressure value to be applied for a steel substrate 5 on a steel drive shaft acting as a rotating element 2 is approximately 100 MPa. This pressure level is to be applied over the entire interface surface between the substrate 5 and the rotating element 2. In this respect, having uniform distribution of this pressure would be preferred.

Finally, in order to complete the sensor 1, the one or more strain gauges 3 can be connected via conductive wires to a suitable electronic signal processing unit. This unit could include the calibration and compensation measurements associated with the manufacturing and mounting tolerances, in particular such as the possible variance in the pressure resulting from the clamping that can affect, for example, the shift and the gain of the output signal.

Several optional embodiments can relate to the substrate 5. In a first optional embodiment, the face of the substrate 5 interfacing with the rotating element 2 advantageously can be surface finish treated in order to at least ensure minimum roughness, thus increasing the friction coefficient.

In a second optional embodiment, the face of the substrate 5 interfacing with the rotating element 2 advantageously can be surface treated by applying a thin layer of a material that allows better friction with the material of the rotating element 2.

In a third optional embodiment, the face of the substrate 5 interfacing with the rotating element 2 can be substantially cylindrical in order to conform to the profile of the rotating element 2, for example, a drive shaft, which will not be provided with a flat surface 2a for receiving the substrate 5. The substrate 5 then no longer assumes the form of a simple plate, but conforms to the profile of the rotating element 2.

In a fourth optional embodiment, the substrate 5 can assume the form of a disk for better pressure distribution.

In a fifth optional embodiment, the thickness of the substrate 5 can be increased in order to measure a higher torque or, on the contrary, a lower torque.

With respect to the pressure means 6a, 6b, in a preferred embodiment, the detachable and adjustable pressure means can be formed by two shell portions 6a, 6b extending each other in order to form a complete shell. Fixing means 7 of the threaded rod type can secure the two shell portions 6a, 6b together, with the two shell portions 6a, 6b then surrounding the substrate 5 and the adhesive material layer 4, as well as a portion 2a of the rotating element 2 inside them.

Figure 2:
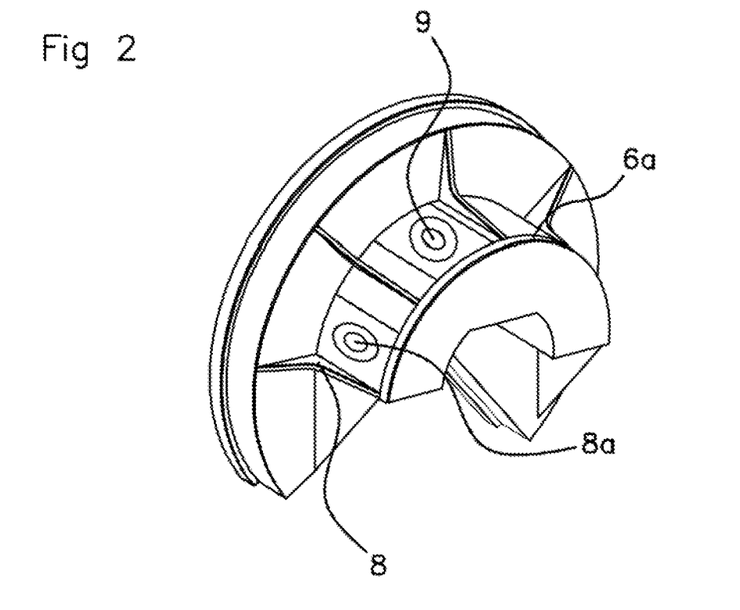
FIGS. 2 to 4 are schematic representations of perspective views, respectively of an upper shell portion, as well as of a first ring fixed on this upper shell portion, of a lower shell portion and of means for fixing the two shell portions relative to each other, the shell portions producing one embodiment of the pressure means for a torque sensor according to an aspect of the present invention.
Figure 3:
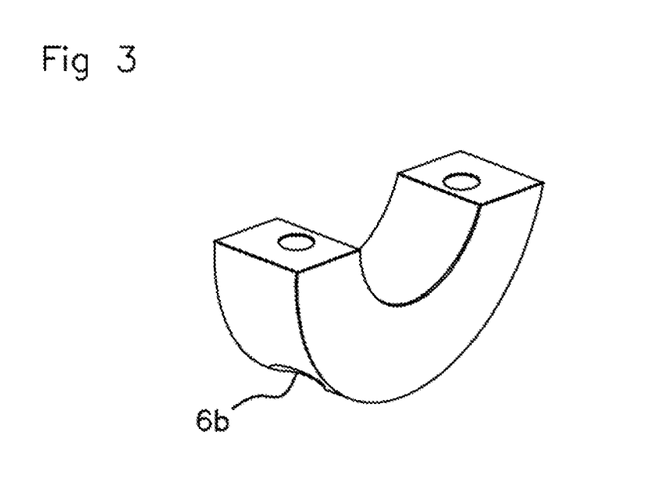

For example, in particular in FIG. 2, a shell portion 6a is shown that is called the upper portion since it is located above the rotating element 2 and, in particular, FIG. 3 shows a shell portion 6b that is called the lower portion since it is located below the rotating element 2, the lower shell portion 6b being smaller than the upper shell portion 6a.

Figure 4:
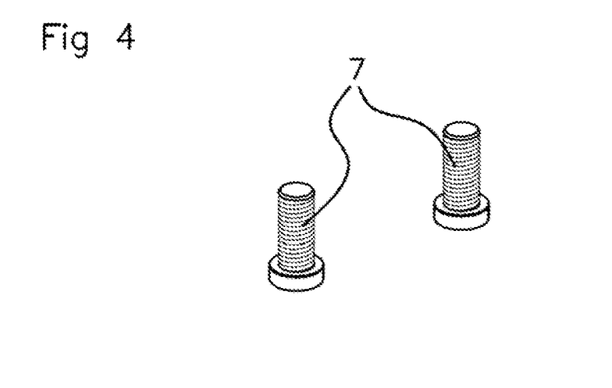

FIG. 4, for example, shows the fixing means 7 in the form of two threaded rods. The threaded rods 7 can firstly enter the lower shell portion 6b through recesses, then the larger upper shell portion 6a. The upper and lower shell portions 6a, 6b are complementary in order to form a complete shell, as is particularly shown in FIG. 9. The threaded rods can extend perpendicular to the axis of rotation of the rotating element 2.

Thus, the outer body of the sensor 1, basically formed by the pressure means 6a, 6b with, where applicable, a first incomplete or complete ring 12, can assume the form of a collar made up of two steel shell portions 6a, 6b.

These shell portions 6a, 6b can each assume the form of a C. The shell portions 6a, 6b can be assembled together and clamped together by using two M6 clamping screws as threaded rods 7 located on either side of the same shell portion. One of the shell portions 6a, 6b can have a central flat surface 15 located on the inner face thereof. This shell portion can be the upper shell portion 6a.

Figure 9:
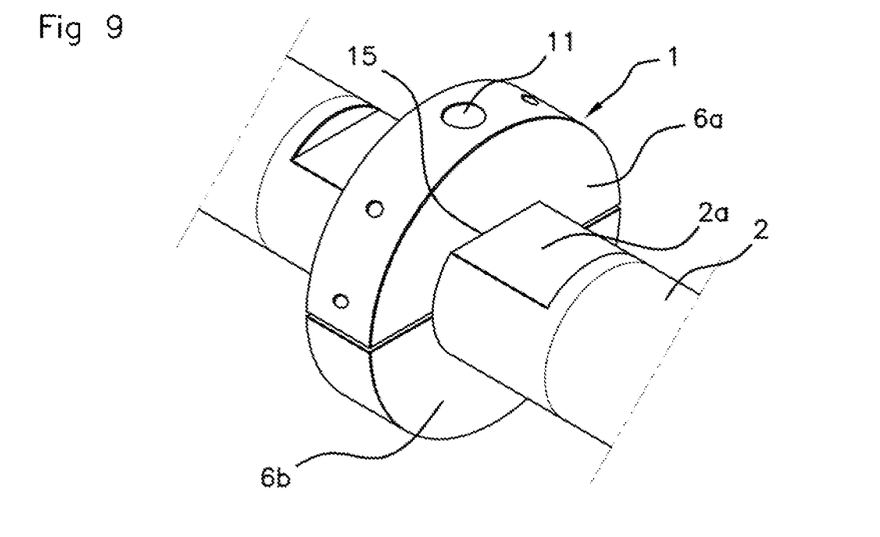
FIG. 9 is a schematic representation of an assembly of a rotating element for which the torque is to be measured and of pressure means of a torque sensor in the form of two shell portions, the rest of the torque sensor not being shown in this figure, the assembly being an assembly according to one embodiment of the invention.

With more particular reference to FIG. 9, the upper shell portion 6a can also have a hole 11 passing through the flat surface 15 and emerging on the outer periphery of the upper shell portion 6a, therefore passing through the upper shell portion 6a from the inner face thereof to the outer face thereof, by extending perpendicular to the axis of rotation of the rotating element 2 when the torque sensor 1 is mounted on the rotating element 2. The substrate 5 is subsequently assembled on the shell portion 6a on this flat surface 15, advantageously by being applied on a face that is opposite a flat surface 2a on the rotating element 2.

As previously stated, the dimensions of the two shell portions 6a, 6b are different, with the substrate 5 and the adhesive material layer 4 being housed in the largest shell portion, which in the figures is the upper shell portion 6a.

Figure 6:
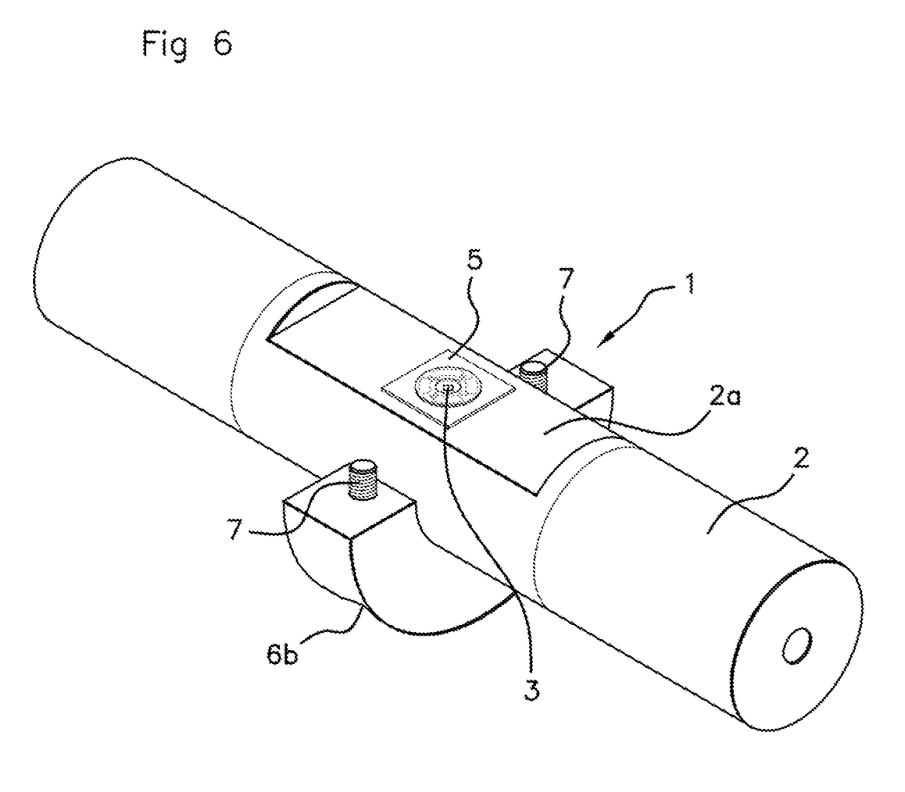
FIG. 6 is a schematic representation of a rotating element for which the torque is to be measured, a substrate and strain gauges, as well as a shell portion as part of the pressure means and forming part of a torque sensor according to one embodiment of the invention shown associated with the rotating element, the rest of the torque sensor not being shown in this figure.

As can be particularly seen in FIG. 6, the lower shell portion 6b can cover the lower half of the rotating element 2 and may not integrate the substrate 5 and the adhesive material layer 4 supporting the one or more strain gauges 3. The threaded rods 7 point toward the upper shell portion 6a, not shown in FIG. 6.

Figure 10:
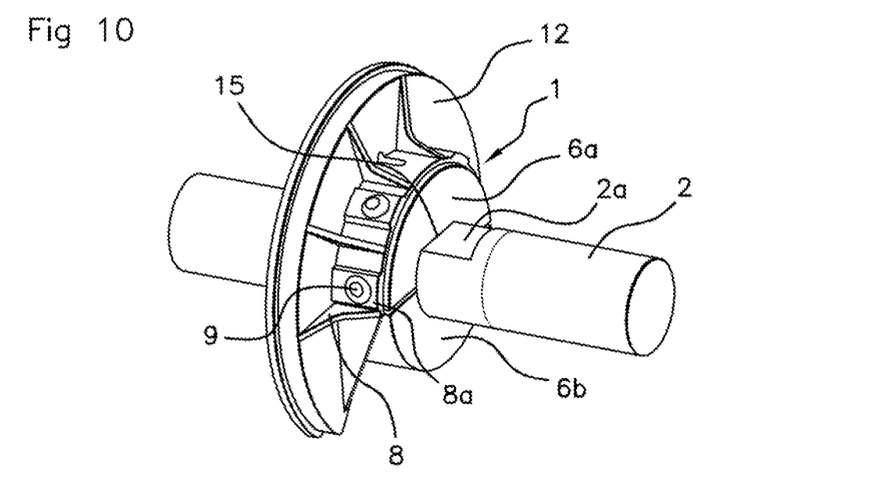
FIG. 10 is a schematic representation of an assembly of a rotating element for which the torque is to be measured and of pressure means of a torque sensor in the form of two shell portions supporting a first incomplete ring, the assembly being an assembly according to one embodiment of the invention.

As can be particularly seen in FIGS. 9 and 10, the two shell portions 6a, 6b that are secured together have a circular outer periphery. In particular in FIG. 10 this circular outer periphery, on which a first incomplete or complete ring 12 is fixed, has an outer diameter that may or may not be greater than the outer periphery of the two shell portions 6a, 6b.

A first incomplete or complete ring 12 means that the first ring 12 may not be complete by not completely encircling the two upper and lower shell portions 6a, 6b, as is the case in FIG. 10, in which the first ring 12 is not complete. In FIG. 9, the first ring 12 is omitted. The first ring 12 also can be complete.

The first incomplete or complete ring 12 can be secured to at least one shell portion 6a, the first ring 12 and the shell portion 6a being intended to be rotated with the rotating element 2. In FIG. 10, the first ring 12 is incomplete and is connected to the upper shell portion 6a that is the largest of the two shells 6a, 6b.

The first incomplete or complete ring 12 can comprise an outer rim connected to at least one of the shell portions 6a, 6b by ribs. Only one of the ribs uses reference sign 8 in the figures that show them, but the description provided for this rib 8 is the same for all the other ribs. The same is the case for all the curved ends with a single curved end, reference sign 8a, and for a connection element 9.

The ribs 8 can extend substantially radially relative to a median axis of the rotating element 2. Each rib 8 can have a curved end 8a facing the one or more shell portions 6a, 6b in order to be at least partially applied against the outer periphery of the shell portions 6a, 6b and to be fixed on the outer periphery by at least one connection element 9. All the curved ends of the ribs 8 are traversed by a connection element 9, for example, of the threaded rod type.

The first ring 12 is wired to the transmission means 14 in the vicinity of the one or more strain gauges 3. Therefore, the first ring 12 comprises wired reception means for receiving the signal transmitted by the transmission means 14, advantageously ports for soldering connection wires.

The first ring 12 also comprises means for electromagnetically transmitting the received signal outside, advantageously to a second fixed ring 10.

For example, the first ring 12 can comprise signal processing means such as an amplifier, one or more filters and a coil driver that emits the magnetic field required to wirelessly transmit to the second ring 10. The second ring 10 can include electronic means with a coil communicating with the coil of the first ring 12 in order to transmit the transmitter power thereto, as well as means for receiving signals sent by the first ring 12 and a microprocessor. The second ring 12 can transmit the information to an external computer through wires since it is fixed.

Part of the electronic means for interpreting signals sent by the one or more strain gauges 3, in addition to the transmission means 14 in the form of a circular interface printed circuit board housed in the vicinity of the one or more strain gauges 3 on the substrate 5 and visible in FIG. 1B, can be housed, also advantageously in the form of a printed circuit board, in the first ring 12 connected by a wired connection to the transmission means 14. The rest of the electronic signal processing means can be housed in a second ring 10 facing the first incomplete or complete ring 12, the first and second rings 12, 10 comprising means for electromagnetically transmitting and receiving between them.

Figure 5:
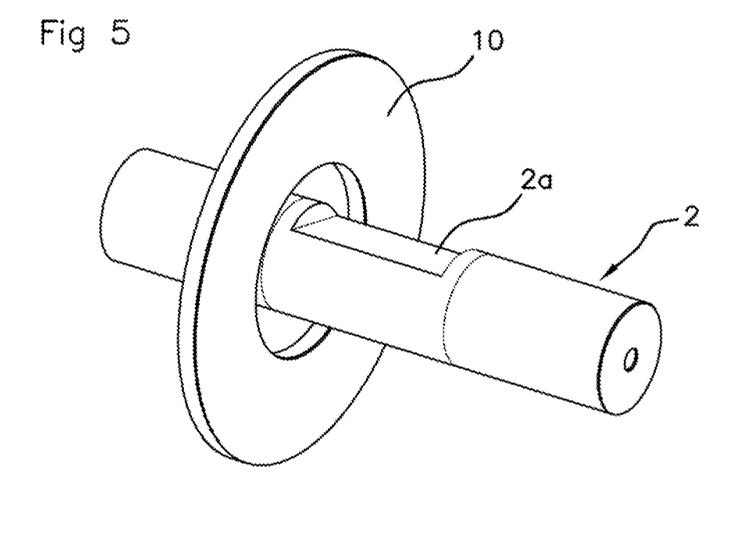
FIG. 5 is a schematic representation of a second ring that can form part of a torque sensor according to an aspect of the present invention, the second ring advantageously being fixed, the rest of the torque sensor not being shown in this figure.
Figure 8:
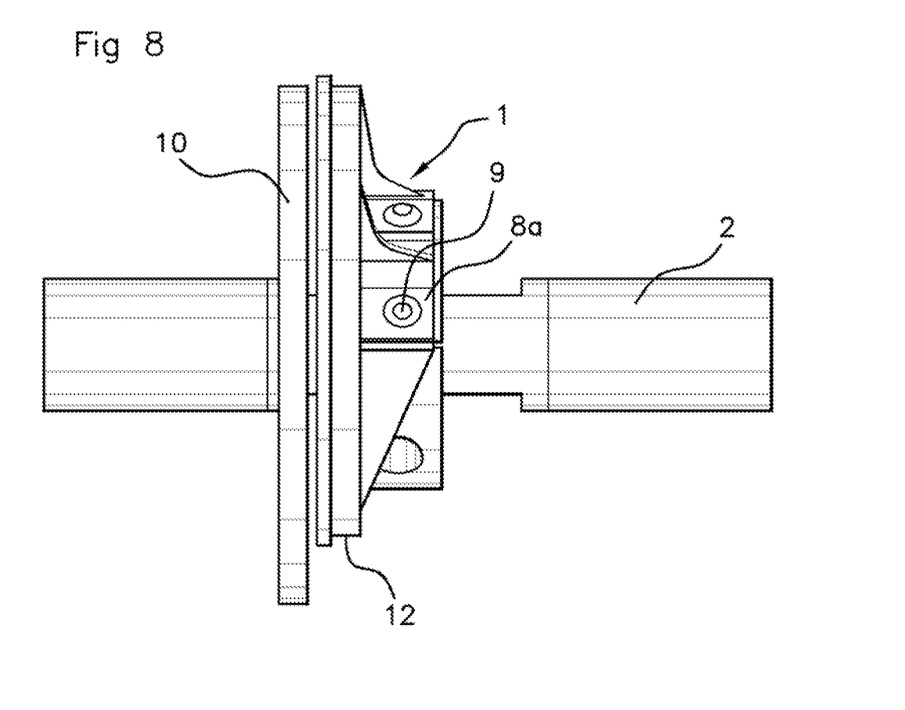
FIG. 8 is a schematic representation of an assembly of a rotating element for which the torque is to be measured and of a torque sensor, the assembly being an assembly according to one embodiment of the invention.

In particular, in FIG. 8, the first 12 and second rings 10 with a diameter that may or may not be similar can be spaced apart from each other by a gap allowing a wireless connection between the first 12 and second 10 rings. The second ring 10 is shown in isolation being introduced around the rotating element 2 in FIG. 5.

The purpose of the second ring 10 is to be connected by a wired connection to the computer of the system and therefore may not be movable for this reason. The second ring 10 therefore must not be fixed on the shaft, but instead on the casing or the housing of the transmission system.

The part of the electronic means that is housed in the second ring can be in the form of a printed circuit board. The second ring 10 can internally contain means for retaining the printed circuit board.

As is particularly shown in FIGS. 6 and 8 to 9, an aspect of the invention also relates to an assembly made up of a rotating element 2 in a motor vehicle and of such a torque sensor 1. In this assembly, the detachable and adjustable pressure means 6a, 6b surround a portion 2a of the rotating element 2 and press a face of the substrate 5 that is opposite that supporting the adhesive material layer 4 against the surrounded portion 2a of the rotating element 2, in order to establish frictional retention between the opposite face of the substrate 5 and the surrounded portion 2a.

The portion intended to be surrounded by the pressure means is particularly clearly shown in FIG. 6, where only the lower shell portion 6b, as pressure means, is shown surrounding the rotating element 2. This surrounded portion can be in the form of a flat surface 2a receiving the opposite face of the substrate 5. In FIG. 6, the flat surface 2a exceeds the lower shell portion 6b in the lengthwise direction of the rotating element 2.

As can be seen in FIG. 6, the one or more strain gauges 3, only one of which is referenced in FIG. 6, can extend at 45° relative to a line parallel to a median axis of the rotating element 2 in a plane of the one or more strain gauges 3, that is the longitudinal median axis for a shaft or a median axis of rotation for a flywheel.

Without being limiting, for a drive shaft as a rotating element 2 provided with a flat surface 2a, the substrate 5 can assume the form of a square 1 mm thick plate made of stainless steel.

With reference to all the figures, a particular type of strain gauge 3 can be mounted on the support face of the substrate 5 supporting the adhesive material layer 4, namely a micro-electromechanical system 3, also known as "MEMS", with piezoresistive cells. The micro-electromechanical system 3 can comprise four cells, the resistances of which allow a complete "Wheatstone bridge" to be produced. The cells can be placed at 90° to each other by forming a square, with this condition nevertheless not being required for a Wheatstone bridge.

The micro-electromechanical system 3 can be positioned at the center of the substrate 5, with the longitudinal axis of the piezoresistive cells included in the micro-system 3 forming a 45° angle with the axis of the shaft of the rotating element 2.

The micro-electromechanical system 3 is fixed on the substrate 5 by high-temperature sintering of an inert glass layer 4 between the micro-electromechanical system 3 and the substrate 5.

The micro-electromechanical system 3 is subsequently electrically connected by electrical connections, in the form of electric wires, to a circular interface printed circuit board 14 positioned around the micro-electromechanical system 3, the board 14 resting on the same face of the substrate 5 as the micro-electromechanical system 3 and forming the transmission means 14 resting on the substrate 5, shown in FIG. 1B.

This printed circuit board 14 can be provided with a first set of contacts, advantageously four contacts, allowing the electrical connection to the contacts of the micro-electromechanical system 3, and a second set of contacts, on which conductive wires 13 are soldered that are intended to join the first ring 12.

With further reference to FIG. 9 and to FIG. 1B in particular, for the optional embodiment with the upper shell portion 6a also having a hole 11 passing through the upper shell portion 6a perpendicular to the axis of rotation of the rotating element 2 up to the flat surface 15 of the upper shell portion 6a, the face of the substrate 5 provided with the micro-electromechanical system 3 and the printed circuit board 14 is brought into contact with the flat surface 15 supported by the upper shell portion 6a. The through-hole 11 therefore allows the micro-electromechanical system 3 and the printed circuit board 14 to be accommodated.

The micro-electromechanical system 3 and the printed circuit board 14 shown in FIG. 1B are not in direct contact with the upper shell portion 6a. The wires of the printed circuit board 14 are passed through the hole 11 in order to be connected to the complementary part of electronic means, advantageously borne by the first ring 12, particularly shown in FIG. 8.

The measured information is therefore transmitted by the circular interface printed circuit board 14 inside the torque sensor and rotating with the rotating element 2 to a complementary electronic part that is also rotating and is contained in the first ring 12, which in turn can then retransmit to a fixed electronic part, which is contained in the second ring 10, the electronic part of the second ring 10 advantageously being in the form of a printed circuit board.

The fixed second ring 10 can transmit all the gathered and interpreted data through wires to a computer of the system, in particular a drive computer in a central electronic unit of the vehicle, with which computer the fixed electronic part supported by the second ring 10 establishes a wired connection.

In one embodiment of the substrate 5 and of the upper shell portion 6a, the substrate 5 can be soldered to the upper shell portion 6a as long as flat contact can still be guaranteed. Furthermore, in order to provide a better seal, the hole 11 subsequently can be filled with a flexible and isolating plastic compound. The wires 13 exiting the torque sensor can be connected to a differential amplifier, as well as to a power supply in order to detect the detection variation of the Wheatstone bridge produced by the micro-electromechanical system 3, as known to a person skilled in the art.

In another alternative embodiment to the previous embodiment, the substrate 5 and the upper shell portion 6a can be the one and the same piece. The hole 11 to be produced in the upper shell portion 6a then does not emerge on the side rotated toward the rotating element 2. The micro-electromechanical system 3 is then mounted at the bottom of this non-emerging hole 11. The remainder of the material at the bottom of the hole forming wells then acts as a membrane instead of the substrate 5.

Finally, an aspect of the invention relates to a method for mounting a torque sensor 1 on a rotating element 2 in a motor vehicle in order to form such an assembly. The method comprises the following steps.

The first step relates to positioning the supporting substrate 5 on a face of the adhesive material layer 4, on which said at least one strain gauge 3 is disposed against a portion 2a of the rotating element 2. During this step, the substrate 5 is applied against the portion 2a of the rotating element 2 via its face that is opposite that supporting the adhesive material layer 4. This can be particularly clearly seen in FIGS. 6 and 7, with the lower shell portion 6b only being positioned around the rotating element 2 in FIG. 6 and no shell portion being positioned around the rotating element 2 in FIG. 7.

The second step relates to positioning pressure means 6a, 6b around the substrate 5 and the rotating element 2, these pressure means 6a, 6b advantageously being in the form of two upper and lower shell portions 6a, 6b.

The third step involves exerting an action on the pressure means 6a, 6b so that the face opposite the substrate 5 is frictionally retained against the portion 2a supported by the rotating element 2 and surrounded by the pressure means 6a, 6b. This can be implemented by the clamping means, advantageously as threaded rods 7 shown in FIG. 4 and completely traversing the lower shell portion 6b and partially traversing the upper shell portion 6a, by extending perpendicular to the median axis of the rotating element 2.

The completion of the method is shown in FIG. 8 or 10, with the pressure means 6a, 6b supporting a first incomplete or complete ring 12 and a second ring 10 being connected to the first ring 12. The pressure means in the form of upper and lower shell portions 6a, 6b completely surround a portion 2a of the rotating element 2 supporting the substrate 5 and the adhesive material layer 4 forming a torque sensor 1 hermetically sealed around the rotating element 2.

In the case of pressure means 6a, 6b in the form of two shell portions 6a, 6b, the two shell portions 6a, 6b can be placed around a portion 2a of the rotating element 2, the substrate 5 advantageously being brought into contact with a flat surface 2a present on this portion of the rotating element 2, advantageously as close to the center as possible, tangentially and axially. Without being limiting, the two shell portions 6a, 6b can be, for example, clamped at 7 kilonewtons, with a range of +/−5% of traction force each, and symmetrically with the same clamping on the two sides in the plane of the axis of the rotating element 2 and with the same clearance between the shell portions 6a, 6b.

Figure 11:
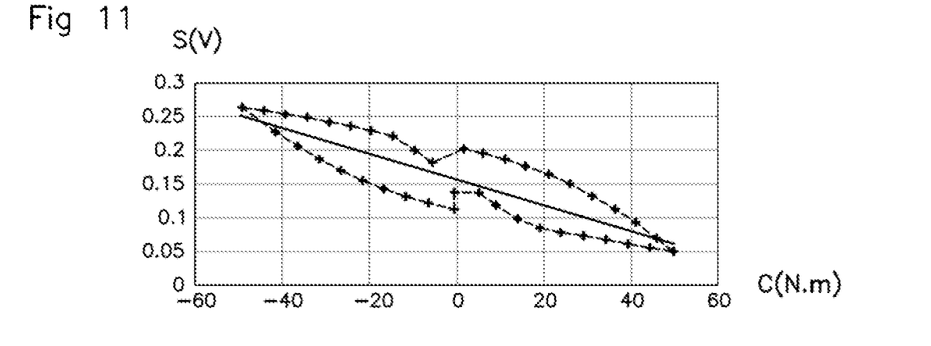
FIG. 11 shows two output signal curves of strain gauges as a function of the torque imposed on the rotating element, the solid line curve illustrating an optimal friction with a minimum achieved friction and the dashed line curve illustrating an excessively low friction showing the hysteresis between the torque sensor and the rotating element in the assembly according to an aspect of the invention.

FIG. 11, by referring to the other figures for the reference signs that are missing in FIG. 11, shows the output signal S(V) of a strain gauge 3 in Volts as a function of the torque C(N·m) to be detected in Newton meters. The dashed line curves outline output signals obtained for excessively low friction. The solid line curve corresponds to achieving the optimal friction, which is greater than a minimal friction.

With excessively low pressure on the substrate 5 and excessively low friction, the obtained curve is not linear and a hysteresis phenomenon will occur. With high enough optimal friction, which can be obtained with the torque sensor according to an aspect of the invention, shown with the solid line curve, good linearity is obtained.

The invention claimed is:

1. A torque sensor configured to be mounted on a rotating element in a motor vehicle, the torque sensor comprising:
   an adhesive material layer;
   at least one strain gauge disposed on the adhesive material layer, said at least one strain gauge transmitting an electric signal as a function of torsion experienced by the rotating element under the effect of a force torque, the reception and transmission of the electric signal allowing the torque of the rotating element to be measured after processing by a transmission means, the adhesive material layer resting on a face of a substrate made of a rigid material configured to ensure frictional retention against the rotating element via its face that is opposite that supporting the adhesive material layer; and a detachable and adjustable pressure means surrounding the adhesive material layer and the substrate, the detachable and adjustable pressure means configured to surround the rotating element and to press the opposite face of the substrate against the rotating element, wherein the detachable and adjustable pressure means are formed by two shell portions extending each other in order to form a complete shell, with a threaded rod type fixing means securing the two shell portions together, with the interior of the two shell portions housing the substrate and the adhesive material layer.

2. The torque sensor as claimed in claim 1, wherein the two shell portions are different sizes, with the substrate and the adhesive material layer being housed in the largest shell portion.

3. The torque sensor as claimed in claim 1, wherein the two shell portions secured together have a circular outer periphery, on which an incomplete or complete first ring is fixed, having an upper outer diameter which may or may not be greater than the outer periphery of the two shell portions, the shell portions and the first incomplete or complete ring being intended to be rotated with the element.

4. The torque sensor as claimed in claim 3, wherein the first incomplete or complete ring comprises an outer rim connected to at least one of the shell portions by ribs, each of the ribs having a curved end facing said at least one shell portion in order to be at least partially applied against the outer periphery and to be fixed on the outer periphery by at least one connection element, the first ring having means for receiving the signal transmitted by the wired transmission means and means for electromagnetically transmitting the signal.

5. The torque sensor as claimed in claim 4, wherein electronic means for receiving and processing the signal transmitted by the electromagnetic transmission means of the first ring are housed in a second ring facing the first incomplete or complete ring, the first and second rings having a diameter that may or may not be similar by being spaced apart from each other by a gap, the second ring being rotationally fixed.

6. The torque sensor as claimed claim 1, wherein the adhesive material layer is a sintered glass layer.

7. The torque sensor as claimed in claim 1, wherein said at least one strain gauge is in the form of a micro-electromechanical system with piezoresistive cells.

8. The torque sensor as claimed in claim 1, wherein the substrate is non-detachably secured to the pressure means while forming a single piece with these pressure means.

9. An assembly made up of a rotating element in a motor vehicle and of a torque sensor as claimed in claim 1, wherein the detachable and adjustable pressure means surround a portion of the rotating element and press a face of the substrate that is opposite that supporting the adhesive material layer against the surrounded portion of the rotating element in order to establish frictional retention between the opposite face of the substrate and the surrounded portion.

10. The assembly as claimed in claim 9, wherein the surrounded portion comprises a flat surface receiving the opposite face of the substrate, said at least one strain gauge extending at 45° relative to a line parallel to a median axis of rotation of the rotating element in a plane of the strain gauge.

11. The assembly as claimed in claim 9, wherein the rotating element is a shaft or a flywheel.

12. A method for mounting a torque sensor on a rotating element in a motor vehicle in order to form an assembly as claimed in claim 9, the method comprising:

positioning the supporting substrate on a face of the adhesive material layer on which said at least one strain gauge is disposed against a portion of the rotating element, the substrate being applied against the portion of the rotating element by its face that is opposite that supporting the adhesive material layer;

positioning pressure means around the substrate and the rotating element; and acting on the pressure means so that the opposite face of the substrate is frictionally retained against the portion.

13. The torque sensor as claimed in claim 2, wherein the two shell portions secured together have a circular outer periphery, on which an incomplete or complete first ring is fixed, having an upper outer diameter which may or may not be greater than the outer periphery of the two shell portions, the shell portions and the first incomplete or complete ring being intended to be rotated with the element.

14. The assembly as claimed in claim 10, wherein the rotating element is a shaft or a flywheel.

* * * * *